Patented May 6, 1952

2,595,359

UNITED STATES PATENT OFFICE 2,595,359

DIPHENYLAMINE DYESTUFFS

Clarence E. Hieserman, Cumberland, Md., assignor to Celanese Corporation of America, New York, N. Y., a corporation of Delaware No Drawing. Application June 13, 1950, Serial No. 167,927

8 Claims. (Cl. 260—397.7)

This invention relates to diphenylamine dyestuffs and relates more particularly to novel diphenylamine dyestuffs suitable for the dyeing of cellulose acetate and other organic derivatives of cellulose materials in valuable deep yellow shades, and to the preparation of said novel diphenylamine dyestuffs.

One of the methods commonly employed for the dyeing of cellulose acetate and other organic derivative of cellulose materials is the solvent dye method. According to this method, a dyestuff is dissolved in a volatile organic solvent and the solvent dyebath is applied to the cellulose acetate or other organic derivative of cellulose material by mechanical impregnation. To obtain dyeings in deep shades by this method, the dyestuff must have a high tinctorial value and a high solubility in the organic solvents that are employed to prepare the solvent dyebath. In addition, to be satisfactory for commercial use, the cellulose acetate and other organic derivative of cellulose materials dyed with said dyestuffs must be fast to light, acid fading, perspiration and washing.

It is an important object of this invention to provide novel diphenylamine dyestuffs which will fulfill the foregoing requirements.

A further object of this invention is to provide novel diphenylamine dyestuffs suitable for the dyeing, by the solvent method, of cellulose acetate and other organic derivative of cellulose materials in valuable deep yellow shades.

Another object of this invention is the provision of a process for the preparation of novel diphenylamine dyestuffs.

Other objects of this invention will be apparent from the following detailed description and claims.

In accordance with this invention, it has been discovered that diphenylamine dyestuffs of the formula

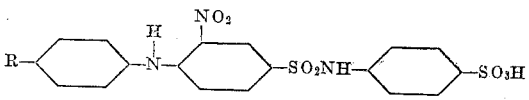

wherein R is hydrogen, a lower alkyl group such as a methyl, ethyl, propyl or butyl group, or a lower alkoxy group such as a methoxy, ethoxy, propoxy or butoxy group, have a high tinctorial value and a high solubility in the solvents that are commonly employed to prepare dyebaths for the dyeing of cellulose acetate and other organic derivative of cellulose materials by solvent dye methods. In addition these novel diphenylamine dyestuffs will dye cellulose acetate and other organic derivative of cellulose materials from solvent dyebaths in valuable deep yellow shades that are fast to light, acid fading, perspiration and washing.

The dyestuffs of this invention may be prepared by reacting 1-chlor-2-nitrobenzene with chlorsulfonic acid to produce 1-chlor-2-nitrobenzene-4-sulfonyl chloride and reacting the product so formed with p-amino-benzene sulfonic acid to produce the intermediate 1-chlor-2-nitrobenzene-4-(p-sulfo sulfonanilide). This intermediate is then reacted with an amine of the formula

wherein R is hydrogen, a lower alkyl group such as a methyl, ethyl, propyl or butyl group, or a lower alkoxy group such as a methoxy, ethoxy, propoxy or butoxy group to produce the desired dyestuff.

As examples of the amines that may be reacted with the 1-chlor-2-nitrobenzene-4-(p-sulfo sulfonanilide) there may be mentioned aniline, p-methyl aniline, p-ethyl aniline, p-propyl aniline, p-butyl aniline, p-methoxy aniline, p-ethoxy aniline, p-propoxy aniline and p-butoxy aniline. Thus, the novel diphenylamine dyestuffs of this invention include 2-nitro-4-(p-sulfo sulfonanilide)-diphenylamine, 2-nitro-4-(p-sulfo sulfonanilide) - 4' - methyl-diphenylamine, 2-nitro-4-(p-sulfo sulfonanilide) - 4'-ethyl-diphenylamine, 2-nitro-4-(p-sulfo sulfonanilide)-4'-propyl-diphenylamine, 2-nitro-4-(p-sulfo sulfonanilide)-4'-butyl-diphenylamine, 2-nitro-4-(p-sulfo sulfonanilide)-4' - methoxy-diphenylamine, 2-nitro-4-(p-sulfo sulfonanilide)-4'-ethoxy-diphenylamine, 2-nitro-4-(p-sulfo sulfonanilide)-4'-propoxy-diphenylamine, and 2-nitro-4-(p-sulfo sulfonanilide)-4'-butoxy-diphenylamine.

The following examples are given to illustrate this invention further.

Example I

To 180 parts by weight of 1-chlor-2-nitrobenzene in a vessel equipped with a stirrer there is added 591 parts by weight of 90.5% chlorsulfonic acid. The mixture is heated to 100° C., with stirring and a considerable evolution of hydrogen chloride begins. The temperature is maintained at 100° C. for one hour, then raised to 110° C., where it is held for one hour, and then raised to 120° C., at which temperature it is maintained for another hour. At this point the evolution of hydrogen chloride is nearly completed. The reaction is continued for three hours longer at a temperature of 130° C. to render the chlorsulfonation substantially complete. The reaction mass is then drowned in 3000 parts by weight of ice and water and filtered. There is obtained a yield of 333 parts by weight of wet press cake containing 1-chlor-2-nitrobenzene-4-sulfonyl chloride.

Example II

In 150 parts by weight of water there is suspended 40 parts by weight of p-amino benzene sulfonic acid. Sodium carbonate solution (25%) is added slowly to the suspension until the p-amino benzene sulfonic acid is fully dissolved and the pH of the solution is neutral (approximately 17 parts by weight of sodium carbonate required). The temperature of the solution is adjusted to 10° C. and 54 parts by weight of the wet press cake obtained in Example I is added thereto. The reaction is allowed to proceed for two hours at 10° C., during which time the pH is maintained neutral by the addition of small amounts of sodium carbonate. The temperature is allowed to rise to 40° C. and held at this value for two hours to complete the reaction. The reaction mass is then filtered to remove any insoluble impurities and there is obtained a clear solution of the intermediate 1-chlor-2-nitrobenzene-4-(p-sulfo sulfonanilide).

Example III

To one-half of the filtrate obtained in Example II there is added 7.2 parts by weight of sodium acetate and 8 parts by weight of aniline. The mixture is heated to mild reflux for four hours with stirring and then cooled, whereupon the dyestuff 2-nitro-4-(p-sulfo sulfonanilide) diphenylamine precipitates in the form of very small crystals. The crystals are separated from the reaction mixture by filtration, washed with cool water to remove salt and excess aniline therefrom and finally dried. There is obtained 37 parts by weight of the dyestuff which is about 84% of theoretical based on the 1-chlor-2-nitrobenzene.

Example IV

To the other half of the filtrate obtained in Example II there is added 7.2 parts by weight of sodium acetate and 13.1 parts by weight of p-methoxy aniline. The mixture is heated to mild reflux for four hours with stirring and then cooled, whereupon the dyestuff 2-nitro-4-(p-sulfo sulfonanilide)-4'-methoxy diphenylamine precipitates in the form of crystals. The crystals are separated from the reaction mixture by filtration, washed with cool water to remove salt and excess p-methoxy-aniline therefrom and finally dried. There is obtained 40.6 parts by weight of the dyestuff which is about 87% of theoretical based on the 1-chlor-2-nitrobenzene.

Example V

A fabric woven from cellulose acetate yarns is dyed by padding thereon a solvent dyebath containing 10 grams per liter of the dyestuff obtained in Example III dissolved in an aqueous mixture containing 75% by volume of ethyl alcohol and 3% by weight of sodium thiocyanate. The dyed fabric has a deep lemon yellow shade which has a light fastness of L-6-60 and a good perspiration fastness when tested by standard A. A. T. C. C. methods. The dyed fabric shows no fading when subjected to 2 units of the standard A. A. T. C. C. acid fading test and passes the A. A. T. C. C. No. 2 washing test.

The dyestuff has a maximum solubility of 15 grams per liter in the mixture employed for forming the dyebath and is therefore suitable for the dyeing, by the solvent method, of cellulose acetate and other organic derivative of cellulose materials in deep lemon yellow shades.

Example VI

A fabric woven from cellulose acetate yarns is dyed by padding thereon a solvent dyebath containing 10 grams per liter of the dyestuff obtained in Example IV dissolved in an aqueous mixture containing 75% by volume of ethyl alcohol and 3% by weight of sodium thiocyanate. The dyed fabric has a deep golden yellow shade which has a light fastness of L-6-60 and a good perspiration fastness when tested by standard A. A. T. C. C. methods. The dyed fabric shows no fading when subjected to 2 units of the standard A. A. T. C. C. acid fading test and passes the A. A. T. C. C. No. 3 washing test.

The dyestuff has a maximum solubility of 20 grams per liter in the mixture employed for forming the dyebath and is therefore suitable for the dyeing, by the solvent method, of cellulose acetate and other organic derivative of cellulose materials in deep golden yellow shades.

While the dyestuffs of this invention have been described specifically in connection with the dyeing of cellulose acetate, which is commercially the most important organic derivative of cellulose material at the present time, they may also be employed for the dyeing of other organic derivative of cellulose materials, such as cellulose propionate, cellulose butyrate, cellulose acetate-propionate, cellulose acetate-butyrate, ethyl cellulose and the like.

It is to be understood that the foregoing detailed description is given merely by way of illustration and that many variations may be made therein without departing from the spirit of my invention.

Having described my invention, what I desire to secure by Letters Patent is:

1. Diphenylamine dyestuffs of the following general formula

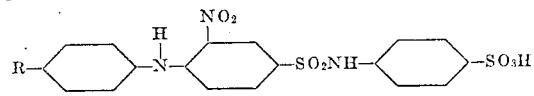

wherein R is a member of the group consisting of hydrogen, a lower alkyl group and a lower alkoxy group.

2. Diphenylamine dyestuffs of the formula

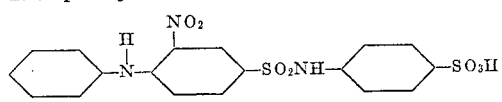

3. Diphenylamine dyestuffs of the formula

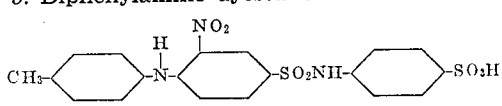

4. Diphenylamine dyestuffs of the formula

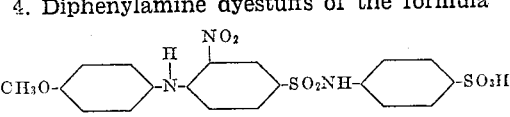

5. Process for the production of diphenylamine dyestuffs which comprises reacting 1-chlor-2-nitrobenzene-4-(p-sulfo sulfonanilide) with an amine of the following general formula

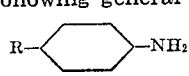

wherein R is a member of the group consisting of hydrogen, a lower alkyl group and a lower alkoxy group.

6. Process for the production of diphenylamine dyestuffs which comprises reacting at reflux temperature 1-chlor-2-nitro-benzene-4-(p-sulfo sulfonanilide) with aniline in an aqueous bath containing sodium acetate.

7. Process for the production of diphenylamine dyestuffs which comprises reacting at reflux temperature 1-chlor-2-nitrobenzene-4-(p-sulfo sulfonanilide) with p-methyl aniline in an aqueous bath containing sodium acetate.

8. Process for the production of diphenylamine dyestuffs which comprises reacting at reflux temperature 1-chlor-2-nitrobenzene-4-(p-sulfo sulfonanilide) with p-methoxy aniline in an aqueous bath containing sodium acetate.

CLARENCE E. HIESERMAN.

REFERENCES CITED

The following references are of record in the file of this patent:

UNITED STATES PATENTS

| Number | Name | Date |
|---|---|---|
| 2,080,704 | Fischer et al. | May 18, 1937 |
| 2,422,029 | McNally et al. | June 10, 1947 |
| 2,474,333 | Seymour et al. | June 28, 1949 |
| 2,506,224 | Kopp | May 2, 1950 |

FOREIGN PATENTS

| Number | Country | Date |
|---|---|---|
| 229,247 | Germany | Dec. 8, 1910 |

OTHER REFERENCES

Fischer: "Ber. Deut. Chem.," vol. 24 (1891), pp. 3791 to 3794.